United States Patent
Inoue

(10) Patent No.: US 7,952,338 B2
(45) Date of Patent: May 31, 2011

(54) BOOST DC/DC CONVERTER

(75) Inventor: Yoshiyuki Inoue, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 361 days.

(21) Appl. No.: 12/189,420

(22) Filed: Aug. 11, 2008

(65) Prior Publication Data

US 2009/0066302 A1    Mar. 12, 2009

(30) Foreign Application Priority Data

Sep. 6, 2007  (JP) .................................. 2007-231524

(51) Int. Cl.
*G05F 1/40* (2006.01)
(52) U.S. Cl. ....................................... 323/282
(58) Field of Classification Search .................. 323/222, 323/271, 282, 283, 285, 901
See application file for complete search history.

(56) References Cited

U.S. PATENT DOCUMENTS

| | | | |
|---|---|---|---|
| 4,801,859 A * | 1/1989 | Dishner | 323/224 |
| 6,414,403 B2 * | 7/2002 | Kitagawa et al. | 307/66 |
| 7,378,824 B2 * | 5/2008 | Chuang et al. | 323/282 |
| 7,750,609 B2 * | 7/2010 | Omi | 323/271 |
| 7,759,911 B2 * | 7/2010 | Omi | 323/222 |
| 2007/0253229 A1 * | 11/2007 | Dowlatabadi | 363/49 |
| 2007/0273347 A1 * | 11/2007 | Chuang et al. | 323/282 |
| 2008/0239774 A1 * | 10/2008 | Canfield et al. | 363/127 |

FOREIGN PATENT DOCUMENTS

| | | |
|---|---|---|
| JP | 5-83930 | 4/1993 |
| JP | 2006-246626 | 9/2006 |

* cited by examiner

*Primary Examiner* — Adolf Berhane
(74) *Attorney, Agent, or Firm* — Cooper & Dunham LLP

(57) ABSTRACT

A disclosed boost DC/DC converter includes a direct-current power source, of which a negative terminal is connected to ground; an inductor connected to a positive terminal of the direct-current power source; a first switching element connected between the inductor and ground and having a control node for controlling an on-resistance thereof; a second switching element connected in series to the inductor and having a control node for controlling an on-resistance thereof; a smoothing capacitor connected between the second switching element and ground; a switching circuit configured to select a voltage of the direct-current power source during a start-up phase, and to select an output voltage of the smoothing capacitor after the start-up phase; and a control unit configured to cause the switching circuit to apply the voltage selected by the switching circuit to the control node of each of the first and the second switching elements at a predetermined cycle.

9 Claims, 4 Drawing Sheets

BOOST DC/DC CONVERTER

BACKGROUND

1. Technical Field

This disclosure relates to a boost DC/DC converter for supplying electric power on the input side to the output side by synchronizing control of two switching elements.

2. Description of the Related Art

A method for converting electric power at high conversion efficiency using a switching DC/DC converter is widely used in order to convert an input direct-current voltage into a predetermined output direct-current voltage in a power supply device. In the switching DC/DC converter, since a channel is formed by two switching elements placed under synchronous control, the on-resistance of the switching elements is reduced, which enables high efficiency power conversion even under heavy load. In the case of the output voltage being high, the on-resistance of the switching elements can be lowered by setting a voltage controlling the switching elements equal to the output voltage, whereby high efficiency power conversion is achieved.

As for the on-resistance of the switching elements, Japanese Laid-open Patent Application Publications No. H05-83930 and No. 2006-246626 describe reducing the on-resistance of the switching elements by gradually increasing the gate voltage of the second switching element in soft start operation.

Patent Document 1: Japanese Laid-open Patent Application Publication No. H05-83930

Patent Document 2: Japanese Laid-open Patent Application Publication No. 2006-246626

Conventional boost DC/DC converters enable soft start operation by reducing inrush current during the start-up phase. However, there is a demand for higher efficiency power conversion during the start-up phase.

BRIEF SUMMARY

In an aspect of this disclosure, there is provided a boost DC/DC converter realizing high efficiency power conversion.

In another aspect, a boost DC/DC converter includes a direct-current power source, of which a negative terminal is connected to ground; an inductor connected to a positive terminal of the direct-current power source; a first switching element connected between the inductor and ground and having a control node for controlling an on-resistance thereof; a second switching element connected in series to the inductor and having a control node for controlling an on-resistance thereof; a smoothing capacitor connected between the second switching element and ground; a switching circuit configured to select a voltage of the direct-current power source during a start-up phase, and to select an output voltage of the smoothing capacitor after the start-up phase; and a control unit configured to cause the switching circuit to apply the voltage selected by the switching circuit to the control node of each of the first and the second switching elements at a predetermined cycle.

DETAILED DESCRIPTION OF THE PREFERRED EMBODIMENTS

Preferred embodiments of the present invention are described with reference to the attached drawings.

A conventional switching DC/DC converter controls its two switching elements by the output voltage, and therefore if the output voltage is low (for example, during the start-up phase), a voltage controlling the switching elements is also low. Under such a condition, losses at the switching elements increase because of an increase in the on-resistance of the switching elements, which leads to a decrease in the power conversion efficiency of the DC/DC converter as a whole. Given this factor, in the boost DC/DC converter of a preferred embodiment of this disclosure, the control voltage for controlling the two switching elements is switched at a predetermined timing after the start-up phase. Specifically, a voltage level different from that of the output voltage is used as the control voltage during the start-up phase, and then the control voltage is switched to the level of the output voltage at a predetermined timing. The different voltage level suffices if it is higher than the level of the output voltage during the start-up phase; however, a power source voltage of an input power source in the boost DC/DC converter is used as the different voltage level in the following description of preferred embodiments. In such a manner, the on-resistance of the switching elements is controlled to be low, which reduces losses at the switching elements, and the boost DC/DC converter is consequently able to achieve high efficiency power conversion.

Figure 1:
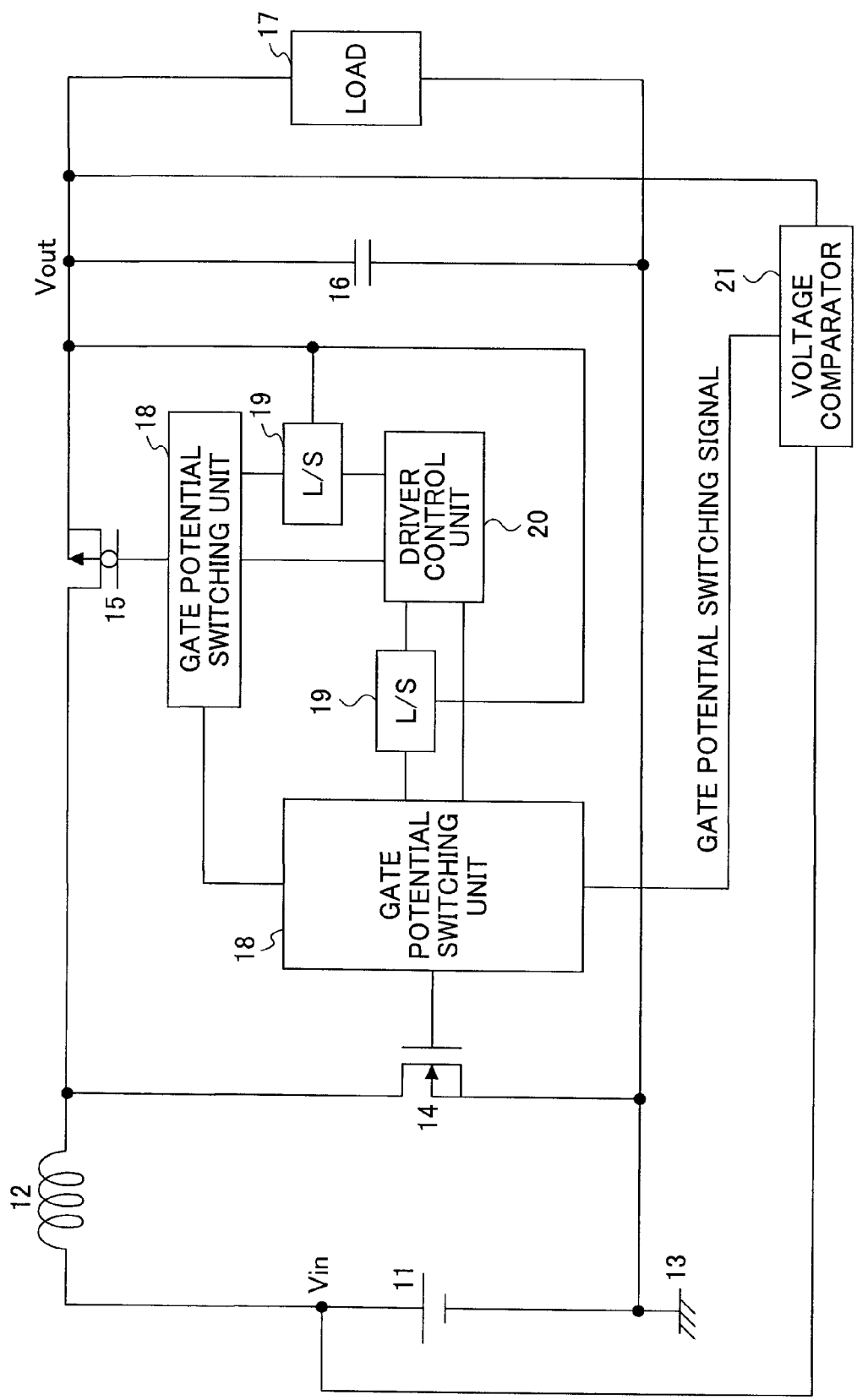
FIG. 1 is a block diagram of a boost DC/DC converter of a first embodiment.

FIG. 1 shows a structure of a boost DC/DC converter according to a first embodiment. In the boost DC/DC converter, an inductor 12 is connected to the positive terminal of an input power source (direct-current power source) 11. The negative terminal of the input power source 11 is connected to ground (GND) 13. A first switching element 14 is connected between the inductor 12 and ground 13 in parallel with the input power source 11 and inductor 12 which are connected in series. A second switching element 15 is connected between the inductor 12 and an output smoothing capacitor 16, which is connected between the second switching element 15 and ground 13. The first and second switching elements 14 and 15 are field effect transistors, for example. An output voltage $V_{out}$ of the smoothing capacitor 16 is applied to a load 17. The output voltage $V_{out}$ of the smoothing capacitor 16 and a power source voltage $V_{in}$ of the input power source 11 are input to two gate potential switching units 18 via level shift circuits (L/S) 19, and each gate potential switching unit 18 outputs one of the output voltage $V_{out}$ and the power source voltage $V_{in}$ to a control unit (gate) of a corresponding one of the switching elements 14 and 15. A voltage comparator 21 compares the power source voltage $V_{in}$ of the input power source 11 and the output voltage $V_{out}$ of the smoothing capacitor 16, and generates a gate potential switching signal for switching to a higher level between the two voltages and then supplies the gate potential switching signal to the gate potential switching units 18. According to the gate potential switching signal, the voltage level of a pulse width modulation voltage applied to the gates of the first/second switching elements 14/15 is switched to the higher one of the output voltage $V_{out}$ and the power source voltage $V_{in}$. A driver control unit 20 controls each gate potential switching unit 18 to generate a pulse width modulation voltage of a predetermined cycle, of which the voltage level corresponds to the gate potential switching signal, and apply the pulse width modulation voltage to the gates of the switching elements 14/15.

The following describes operations of the boost DC/DC converter according to the first embodiment. A pulse width modulation voltage of a predetermined cycle is applied to the gates of the switching elements 14/15 by the corresponding gate potential switching units 18. The switching elements 14 and 15 are alternately brought into conduction. As a result of the comparison by the voltage comparator 21, the gates of the switching elements 14/15 are controlled at a higher potential between the output voltage $V_{out}$ and the power source voltage $V_{in}$. For example, in the case of $V_{in} < V_{out}$, the gate control voltage for the switching elements 14/15 is controlled at the $V_{out}$ potential. On the other hand, in the case of $V_{in} > V_{out}$, the gate control voltage for the switching elements 14/15 is controlled at the $V_{in}$ potential. By this control, the switching elements 14 and 15 operate with a high gate voltage being applied on a constant basis. As a result, the on-resistance of the switching elements 14 and 15 is lowered, thereby reducing losses of the boost DC/DC converter of the present embodiment. Thus, the efficiency of the boost DC/DC converter of the present embodiment as a whole can be improved.

Figure 2:
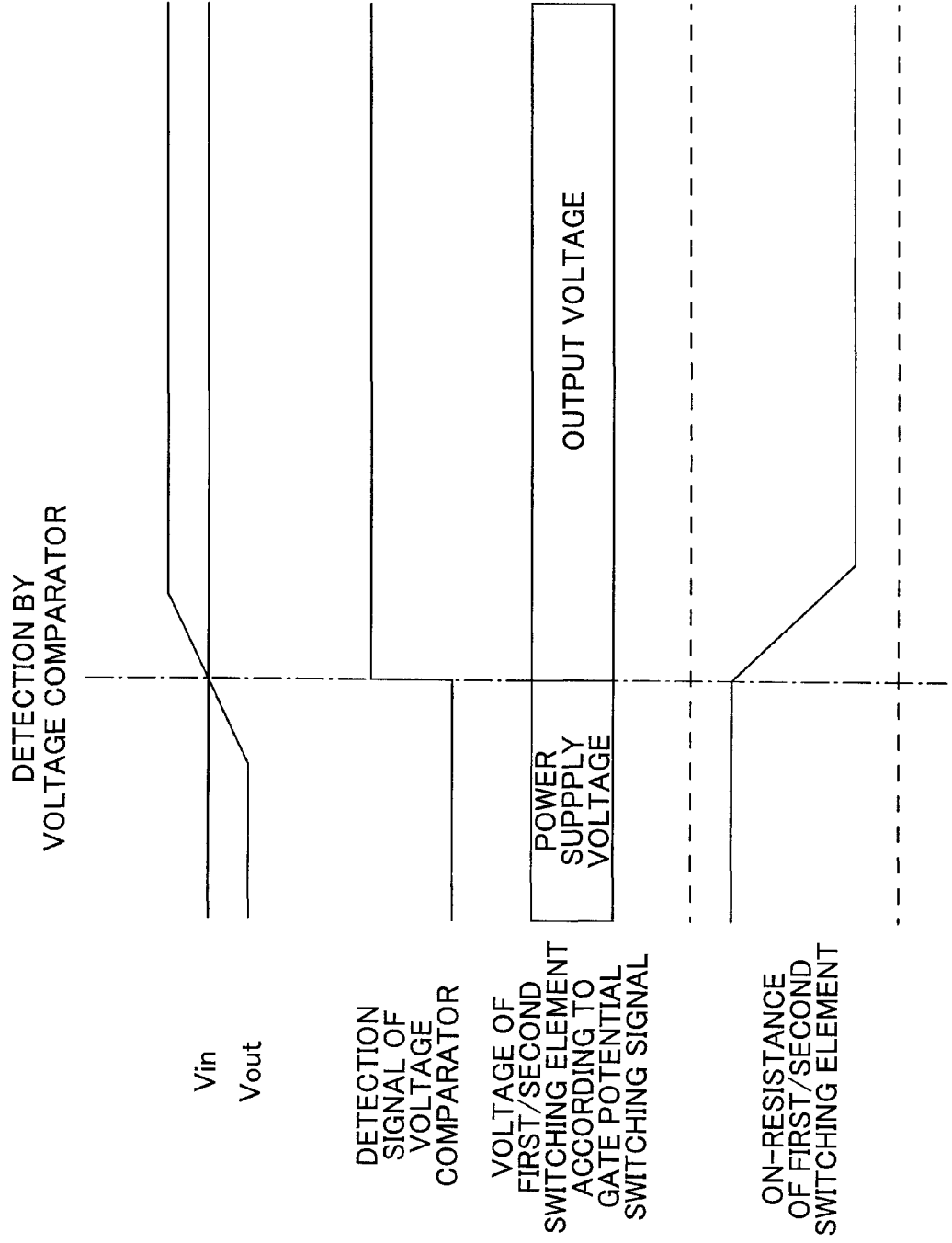
FIG. 2 shows timing for switching a gate control voltage for switching elements and time change of on-resistance of the switching elements according to the first embodiment.

FIG. 2 shows timing for switching the gate potential of the switching elements 14/15 of the boost DC/DC converter according to the present embodiment. FIG. 2 illustrates time change of the following: the power source voltage $V_{in}$ and the output voltage $V_{out}$; a detection signal of the voltage comparator 21; the gate control voltage for the switching elements 14/15; and the on-resistance of the switching elements 14/15. The power source voltage $V_{in}$ and the output voltage $V_{out}$ are compared by the voltage comparator 21, and then the control units (gate) of the switching elements 14/15 are controlled at a higher potential of the power source voltage $V_{in}$ and the output voltage $V_{out}$. At the point when the voltage comparator 21 detects that the two voltages $V_{in}$ and $V_{out}$ are equal to each other, the gate control voltage is switched, whereby the on-resistance of the switching elements 14 and 15 during conduction starts decreasing and eventually becomes constant. Although the on-resistance depends on the gate voltage, a higher one of the power source voltage $V_{in}$ and the output voltage $V_{out}$ is applied, and it is therefore possible to lower the on-resistance. Thus, reducing losses at the switching elements enables improving the efficiency of the boost DC/DC converter of the present embodiment.

Now a description is given of the example shown in FIG. 2. In the boost DC/DC converter of the present embodiment, when the power source voltage $V_{in}$ of the input power source 11 and the output voltage $V_{out}$ of the smoothing capacitor 16 during the start-up phase are compared, the power source voltage $V_{in}$ is higher. Accordingly, the gate control voltage applied to the switching elements 14/15 according to the gate potential switching signal is set equal to the level of the power source voltage $V_{in}$. Therefore, the on-resistance of the switching elements 14/15 is controlled to be a value depending on the power source voltage $V_{in}$. When the output voltage $V_{out}$ becomes higher than the power source voltage $V_{in}$ after the start-up phase, the gate control potential for the switching elements 14/15 is switched to the output voltage $V_{out}$. As a result, the on-resistance of the switching elements 14/15 can be lowered compared to the case where the switching elements 14/15 are controlled at the power source voltage $V_{in}$ level, thereby reducing losses at the switching elements 14/15. In this manner, even when the power source voltage $V_{in}$ becomes lower than the output voltage $V_{out}$, losses at the switching elements 14/15 are maintained at a low level, independent of the power source voltage $V_{in}$, and thus high efficiency power conversion can be achieved.

Figure 3:
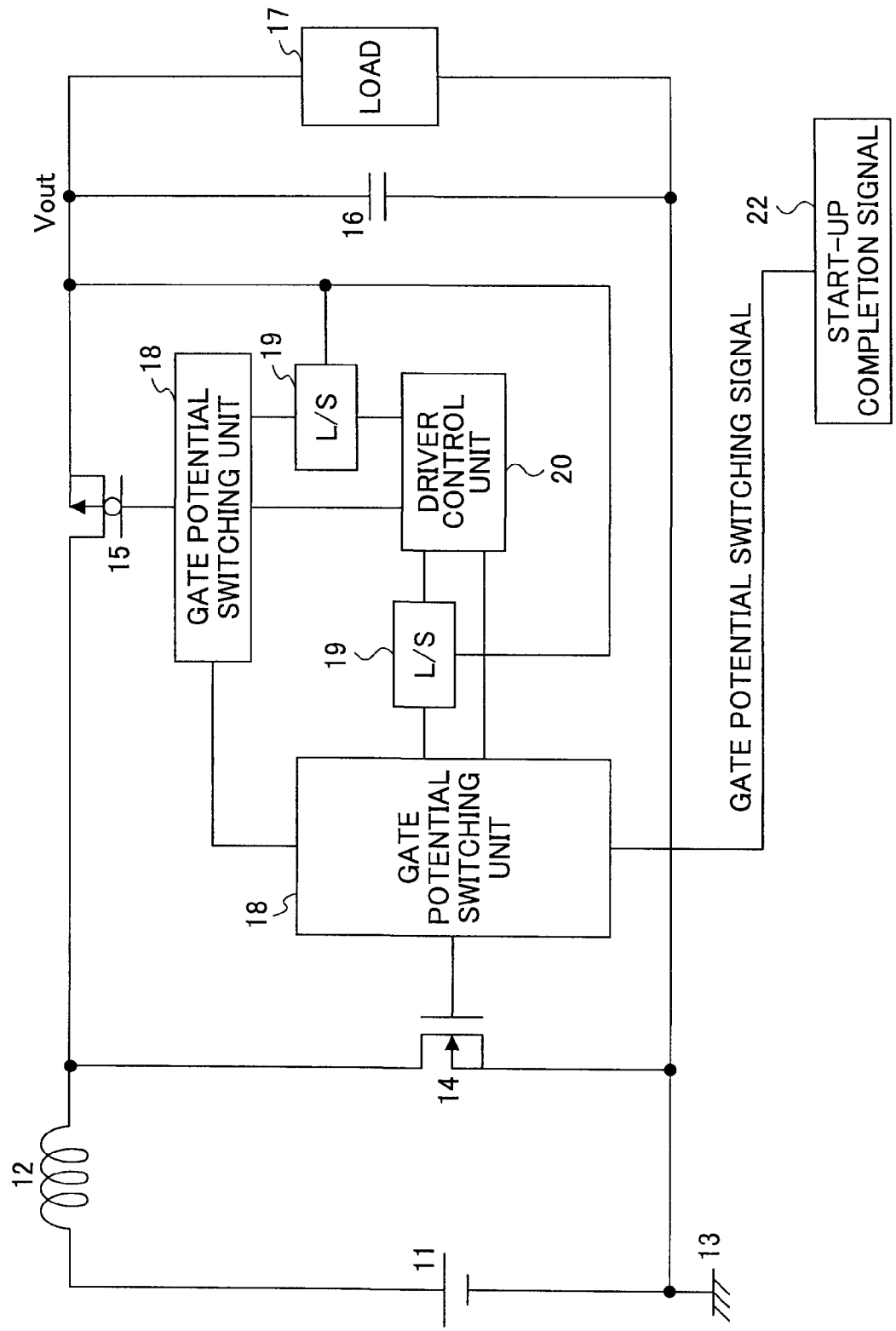
FIG. 3 is a block diagram of a boost DC/DC converter of a second embodiment.

FIG. 3 shows a structure of a boost DC/DC converter of a second embodiment. Although the basic structure is the same as that of the boost DC/DC converter of FIG. 1, the second embodiment differs in that the gate potential switching units 18 use as the gate potential switching signal which determines a potential used to control the switching elements 14/15, not the comparison result by the voltage comparator 21, but a start-up completion signal 22. The boost DC/DC converter of the present embodiment generates signals corresponding to start-up, shutdown and stand-by. Accordingly, the gate potential switching unit 18 switches the gate control voltage using the start-up completion signal 22 generated at the completion of the start-up. In the boost DC/DC converter of the present embodiment, the relationship of $V_{out} < V_{in}$ holds during stand-by and for some time after the start-up; however, when the start-up completes, the relationship is changed to $V_{out} > V_{in}$. Therefore, the gate potential switching unit 18 switches the gate control potential for the switching elements 14/15 in accordance with the start-up completion signal 22. The effect obtained by switching the control voltage in this way is equivalent to the case of the DC/DC converter of FIG. 1.

Figure 4:
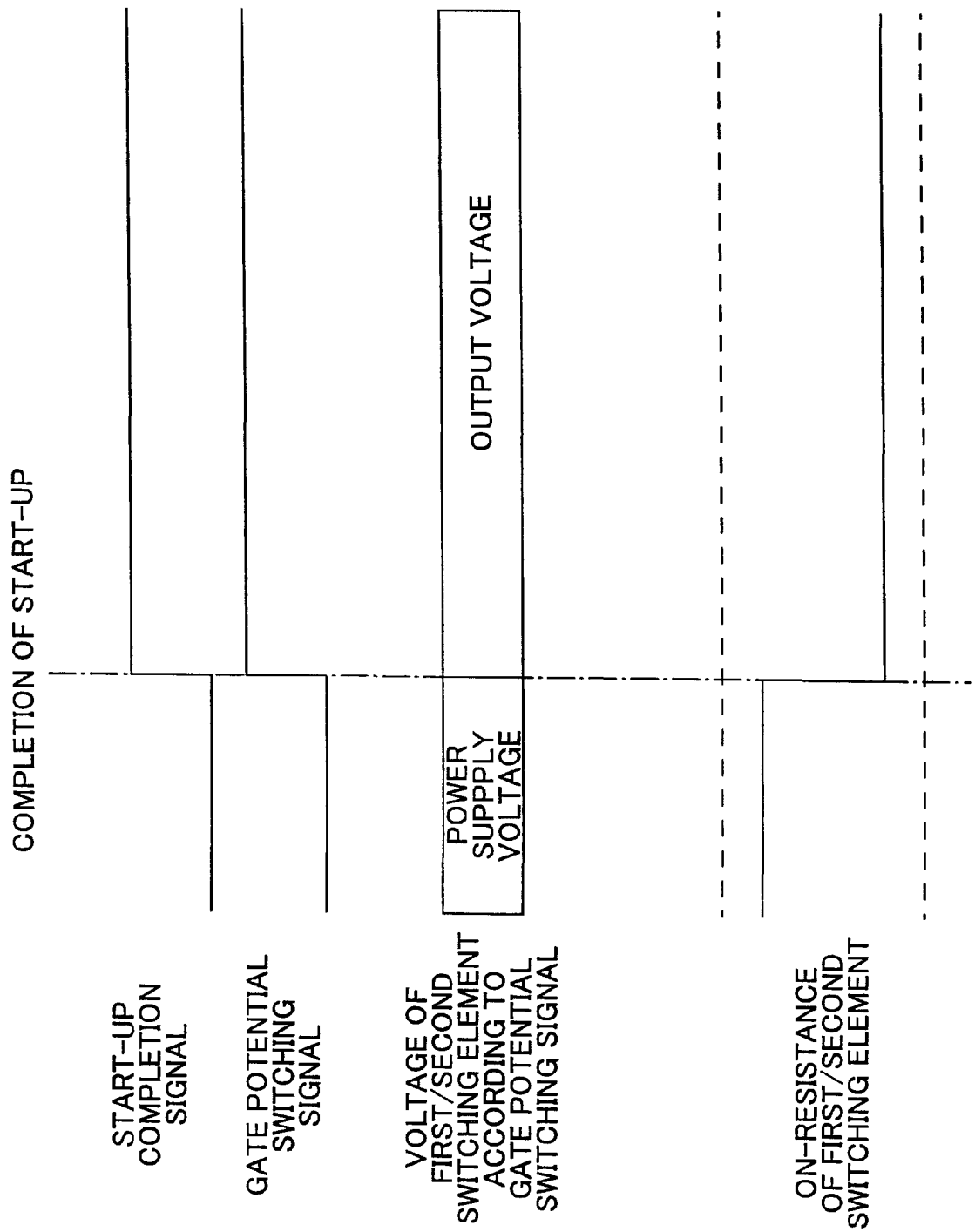
FIG. 4 shows timing for switching a gate control voltage for switching elements and time change of on-resistance of the switching elements according to the second embodiment.

FIG. 4 shows timing for switching the gate potential of the switching elements 14/15 of the boost DC/DC converter according to the second embodiment. FIG. 4 illustrates time change of the start-up completion signal 22; the gate potential switching signal; the gate control voltage for the switching elements 14/15; and the on-resistance of the switching elements 14/15 during conduction. Instead of a direct comparison of the power source voltage $V_{in}$ and the output voltage $V_{out}$, the start-up completion signal is used in the second embodiment. As has been described above, in the boost DC/DC converter of the present embodiment, the relationship of $V_{out} < V_{in}$ is maintained during stand-by and for some time after the start-up; however, the relationship is changed to $V_{out} > V_{in}$ after the completion of the start-up. Accordingly, the gate potential switching unit 18 uses the start-up completion signal as a determination flag to switch the gate control voltage for the switching elements 14/15 from the power source voltage $V_{in}$ to the output voltage $V_{out}$. Herewith, the DC/DC converter of the present embodiment is able to operate with low on-resistance of the switching elements 14/15, similar to the case shown in FIG. 2. Reducing losses at the switching elements 14 and 15 in this manner enables an improvement of the efficiency of the DC/DC converter of the present embodiment.

According to the boost DC/DC converter of the above-described embodiments of the present invention, since the gate control voltage for the switching elements is changed in accordance with the level of the output voltage, it is possible to lower the on-resistance of the switching elements during the start-up phase, thereby reducing losses of the boost DC/DC converter.

This application is based on Japanese Patent Application No. 2007-231524 filed in the Japan Patent Office on Sep. 6, 2007, the contents of which are hereby incorporated herein by reference.

What is claimed is:

1. A boost DC/DC converter comprising:
   a direct-current power source, of which a negative terminal is connected to ground;
   an inductor connected to a positive terminal of the direct-current power source;

a first switching element connected between the inductor and the ground and having a first control node for controlling an on-resistance thereof;

a second switching element connected in series to the inductor and having a second control node for controlling an on-resistance thereof;

a smoothing capacitor connected between the second switching element and the ground;

a switching circuit configured to select a voltage of the direct-current power source during a start-up phase, and to select an output voltage of the smoothing capacitor after the start-up phase; and a control unit configured to cause the switching circuit to apply the voltage selected by the switching circuit to the first control node of the first switching element and the second control node of the second switching element at a predetermined cycle.

2. The boost DC/DC converter as claimed in claim 1, wherein the switching circuit includes a voltage comparator configured to compare the voltage of the direct-current power source and the output voltage, and the switching circuit selects the voltage of the direct-current power source during a time when the output voltage is lower than the voltage of the direct-current power source and selects the output voltage during a time when the output voltage is higher than the voltage of the direct-current power source.

3. The boost DC/DC converter as claimed in claim 1, wherein the switching circuit selects the voltage of the direct-current power source before receiving a start-up completion signal that indicates completion of the start-up phase, and selects the output voltage after receiving the start-up completion signal.

4. The boost DC/DC converter as claimed in claim 1, wherein the output voltage of the smoothing capacitor is applied to a load.

5. The boost DC/DC converter as claimed in claim 1, wherein the output voltage of the smoothing capacitor corresponds to a voltage at a node directly connected to the smoothing capacitor and the second switching element.

6. The boost DC/DC converter as claimed in claim 1, wherein the output voltage of the smoothing capacitor corresponds to a voltage at a node directly connected to the smoothing capacitor, the second switching element and a load.

7. The boost DC/DC converter as claimed in claim 1, wherein the voltage of the direct-current power source and the output voltage of the smoothing capacitor are input to a first gate potential switching unit connected to the first switching element and a second gate potential switching unit connected to the second switching element, and each of the first and second gate potential switching units outputs any one of the voltage of the direct-current power source and the output voltage of the smoothing capacitor to the corresponding ones of the first and second switching elements.

8. The boost DC/DC converter as claimed in claim 1, wherein the switching circuit applies the greater of the voltage of the direct-current power source and the output voltage of the smoothing capacitor to the first control node of the first switching element and the second control node of the second switching element.

9. The boost DC/DC converter as claimed in claim 1, wherein the first and second switching elements are field effect transistors, and the first and second control nodes that receive the voltage selected by the switching circuit are gates of the respective ones of the first and second switching elements.

* * * * *